F. NELLEN.
HEN COOP.
APPLICATION FILED DEC. 30, 1912.

1,162,386.

Patented Nov. 30, 1915.

Witnesses
Emil Geyer

Inventor:
Friedrich Nellen
by
Attorney.

UNITED STATES PATENT OFFICE.

FRIEDRICH NELLEN, OF BREDENEY, NEAR ESSEN-ON-THE-RUHR, GERMANY.

HEN-COOP.

1,162,386. Specification of Letters Patent. Patented Nov. 30, 1915.

Application filed December 30, 1912. Serial No. 739,319.

*To all whom it may concern:*

Be it known that I, FRIEDRICH NELLEN, a citizen of the German Empire, and residing at Bredeney, near Essen-on-the-Ruhr, Germany, have invented certain new and useful Improvements in Hen-Coops, of which the following is a specification.

The management of large poultry-farms is rendered considerably more difficult and expensive owing to the daily collection of the eggs being connected with great trouble and great loss of time. The effect of the expenses connected herewith on the total working expenses is so great that the profitableness of large farms is hereby made questionable.

According to the invention, collecting the eggs is facilitated by the nests being arranged in a portable nest-carrier, so that the nests containing the eggs can be conducted in succession to a common place where the eggs are removed. This nest-carrier is made circular and the individual coops are arranged in known manner in the form of sectors so that the nest-carrier has the shape of a ring which is, for example supported on wheels which run on a circular rail or track. If the egg-collecting and egg-packing rooms are likewise arranged in sectors when the nest-carrier is driven around on the track all the nests can successively be brought to the packing place which considerably simplifies and cheapens the work of collecting and despatching the eggs, and the production of the eggs can be made very profitable which is not possible without this arrangement.

One form of my invention is represented by way of example in the accompanying drawing, wherein:—

Figure 1:
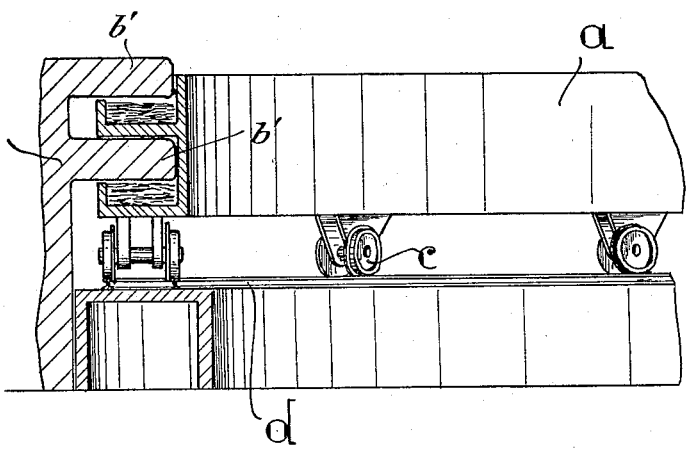
Figure 2:
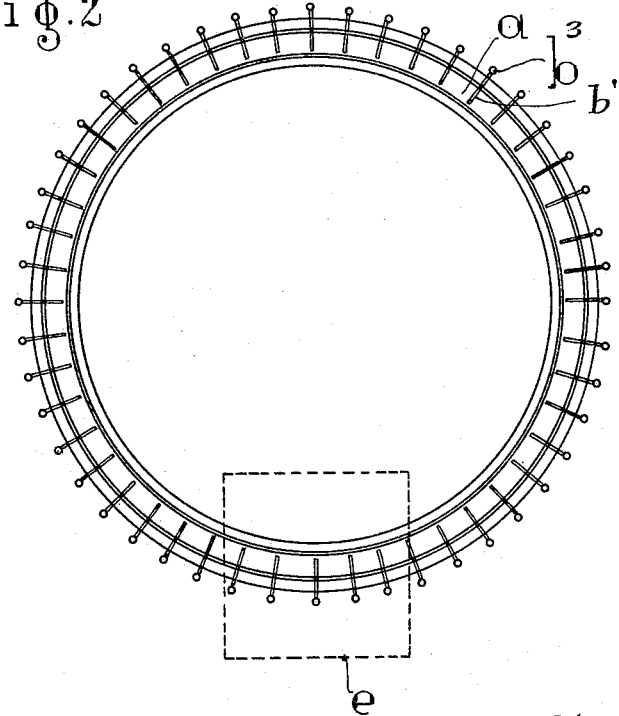

Figure 1 shows one part of the portable nest-carrier in elevation, partly in section, and Fig. 2 is a plan view of an alternative form showing the entire construction.

The nest-carrier $a$ comprises a double annular channel so that two rows of nests can be arranged one above the other. The dividing walls $b$ of Fig. 1, or the posts $b^3$ of Fig. 2, have partitions or walls $b^1$, which extend inwardly and over the annular channel or channels of the nest-carrier $a$, so that the individual compartments are separated from one another and on the nests beginning to move the hens are driven away from them. The nest-carrier is carried by the wheels $c$ which run on the circular track $d$. The place for collecting the eggs is shown at $e$.

I have shown embodiments of my invention, but it is clear that changes may be made therein without departing from the spirit of the invention, as defined in the appended claims.

I claim:—

1. A hen-coop comprising an elongated horizontal nest carrier, a plurality of vertical walls stationary in respect to the nest-carrier and dividing said carrier into a plurality of compartments for forming individual nests, and means for moving said carrier from its position forming the said nests, to another position for collecting the eggs in the individual nests at a single point.

2. A hen-coop comprising a movable carrier formed by a channel circularly arranged, a plurality of radially arranged walls stationary in respect to the carrier and dividing said channel into a plurality of individual compartments for forming individual nests, and means for rotatably supporting said carrier.

3. A hen-coop comprising a movable carrier formed of a plurality of circular channels, one arranged on top of the other, a plurality of radially arranged walls stationary in respect to the carrier and dividing said channels into a plurality of individual compartments for forming nests, and means for rotatably supporting said carrier.

4. A hen-coop comprising a circular carrier, provided with wheels, tracks for said wheels, said carrier being provided with a channel for forming nests, and a plurality of stationary walls for dividing said channel into a plurality of individual compartments for forming individual nests when said carrier is stationary in respect to the stationary walls.

In testimony whereof, I have signed my name to this specification in the presence of two witnesses.

FRIEDRICH NELLEN. [L. S.]

Witnesses:
  HELEN NUFER,
  ALBERT NUFER.